United States Patent Office 3,476,788
Patented Nov. 4, 1969

3,476,788
DERIVATIVES OF THE GROWTH REACTION OF ETHYLENE WITH TRIHYDRODICYCLOPENTADIENYL ALUMINUM
Guenter Bruno, Somerville, N.J., assignor to Mobil Oil Corporation, a corporation of New York
No Drawing. Filed Sept. 19, 1966, Ser. No. 580,170
Int. Cl. C07f 5/06
U.S. Cl. 260—448   5 Claims

ABSTRACT OF THE DISCLOSURE

Growth compounds are presented, which are prepared by reacting ethylene with tri-hydrocyclopentadienyl aluminum compounds at elevated temperature and pressure. The products can be converted to triethyl (or higher n-alkyl) aluminum cocatalysts for polymerization.

---

This invention is directed to organoaluminum compounds. It is more particularly concerned with α-aluminum-ω-hydrodicyclopentadienyl hydrocarbons and their preparation.

As is well known to those familiar with the art, it is established practice to convert primary aluminum trialkyls of the type, $Al(CH_2\text{—}CH_2R)_3$, wherein R is straight chain alkyl group, to aluminum trialkyls of higher molecular weight by a growth reaction with ethylene according to the equation:

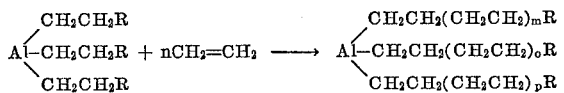

$n$ in this equation represents the total number of moles of ethylene reacted with 1 mole of starting aluminum trialkyl, the sum of $(m+o+p)$ equals $n$, and $m$, $o$ and $p$ are whole numbers 0, 1, 2, 3 . . . The molecular weights of the alkyl groups $—CH_2CH_2(CH_2CH_2)_{m(o,p)}R$ show, for every given $n$, a (different) distribution which is known as Poisson distribution, and which can be expressed by the mathematical equation $$x(p) = \frac{np \cdot e^{-n}}{p!}$$

where n represents the moles of inserted ethylene per R′-al equivalent (al=⅓ Al, R′=R—$CH_2$—$CH_2$), $p$ is the number of ethylene units in the formed individual carbon chains, and $x_{(p)}$ is the mole fraction of the chains with $p$ inserted ethylene units. This so-called "growth reaction" required in its conventional version an ethylene pressure of aprox. 100 atmospheres and temperatures between 90 and 120° C. In the short-time high-temperature version of this same process, pressures of approx. 100–200 atmospheres and temperatures between 150 and 200° C. are utilized. The reaction has commercial significance for the production of monofunctional straight-chain aliphatic chemicals, e.g., "alfols" and "alfenes."

It is noteworthy to remark that it was hitherto believed that this reaction can only be realized if aluminum trialkyls of the above described type are used as starting materials. It had been recognized early that with aluminum triisobutyl, the growth products of aluminum triethyl are obtained predominantly, due to the extreme ease with which isobutene is split off from triisobutyl aluminum. In other words, if triisobutyl aluminum is heated with ethylene of 100 atm. pressure to 100° C., or if triisobutyl aluminum is brought into contact with ethylene under the conditions of the short-time high-temperature growth reaction, initially displacement occurs according to:

$Al(iso\text{-}C_4H_9)_3 + 3CH_2\text{=}CH_2 \rightarrow Al(C_2H_5)_3 + 3iso\text{-}C_4H_8$ followed by normal growth reaction of triethyl aluminum.

It is moreover known that the affinity of the C=C double bond with respect to its addition across al-H decreases substantially in the sequence 1,1-dialkylethylene>cycloolefin. See Ziegler et al., Ann. Chem. 589, 99–107 (1954). In view of this very accurately established fact it had to be expected that, since isobutene, a 1,1-dialkylethylene, is so promptly displaced by ethylene from its "addition" compound with al-H (i.e., triisobutyl aluminum) under growth reaction conditions, an even much faster displacement would occur under the same conditions if ethylene were to be brought into contact with an "addition" compound of a cycloolefin with al-H, e.g., tricyclooctyl aluminum, or tri-hydrodicyclopentadienyl aluminum. In agreement with this assumption no reports have appeared in the pertinent patent and other literature concerning growth reactions with aluminum trialkyls other than those of the type $Al(CH_2CH_2R)_3$, wherein R is alkyl, aryl, or hydrogen.

It has now been discovered that, quite surprisingly, tri-hydrocyclopentadienyl aluminum compounds (in which Al is attached to a secondary or tertiary ring carbon atom) and their ring-substituted derivatives undergo a growth reaction with ethylene without the displacement reaction.

Accordingly, it is a broad object of this invention to provide novel organoaluminum compounds and a method for preparing them. A specific object is to provide α-aluminum-ω-hydrodicyclopentadienyl hydrocarbons and substituted derivatives thereof. Another specific object is to provide a process for preparing such compounds. Other objects and advantages of this invention will become apparent to those skilled in the art, from the following detailed description.

This invention provides compounds having the formula:

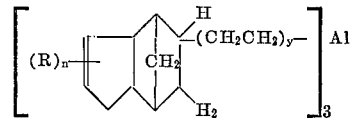

wherein R is hydrogen, alkyl ($C_1$–$C_4$), aryl, alkoxy ($C_1$–$C_4$), aryloxy, or alkyl ($C_1$–$C_4$) mercapto, $n$ is 1 to 2, and $y$ is 1 to 10.

It also provides a method for producing these compounds that comprises reacting a tri-hydrodicyclopentadienyl aluminum compound reactant having the formula:

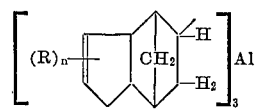

wherein R and $n$ are as aforedefined, with ethylene under growth reaction conditions.

Examples of the compounds of this invention are tri-hydrodicyclopentadienylethyl aluminum,
tri-hydrodicyclopentadienlbutyl aluminum,
tri-hydrodicyclopentadienylhexyl aluminum, tri-hydrodicyclopentadienyloctyl aluminum,
tri-hydrodicyclopentadienyltetradecyl aluminum,
tri-methylhydrocyclopentadienylbutyl aluminum,
tri-butylhydrodicyclopentadienylhexyl aluminum,
tri-phenylhydrodicyclopentadienyloctyl aluminum
tri-isopropoxyhydrodicyclopentadienylethyl aluminum,
tri-ethoxyhydrodicyclopentadienyldodecyl aluminum
tri-tolyloxyhydrodicyclopentadienylethyl aluminum,
tri-ethylmercaptohydrodicyclopentadienylhexyl alminum,
tri-butylmercaptohydrodicyclopentadienyloctyl aluminum, and
tri-dimethylhydrodicyclopentadienylbutyl aluminum.

In addition to tri-hydrodicyclopentadienyl aluminum, examples of the tri-hydrodicyclopentadienyl aluminum compound reactant tri-methylhydrodicyclopentadienyl aluminum,
tri-butylhydrodicyclopentadienyl aluminum,
tri-phenylhydrodicyclopentadienyl aluminum,
tri-isopropoxyhydrodicyclopentadienyl aluminum,
tri-ethoxyhydrodicyclopentadienyl aluminum,
tri-tolyloxyhydrodicyclopentadienyl aluminum,
tri-ethylmercaptohydrodicyclopentadienyl aluminum,
tri-butylmercaptohydrodicyclopentadienyl aluminum, and
tri-dimethylhydrodicyclopentadienyl aluminum.

As described in U.S. Patent No. 2,826,598, the tri-hydrocyclopentadienyl aluminum compounds are made by addition of aluminum trihydride to a dicyclopentadiene.

The required and the preferred conditions of the growth reaction of tri-hydrodicyclopentadienyl aluminum compounds with ethylene can be summarized as follows:

sulting aluminum alkoxides to ω-hydrodicyclopentadienyl α-hydroxy alkanes

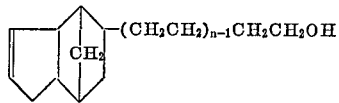

or by reaction with, e.g., $BF_3$, $KBF_4$, $SiF_4$, $Na_2SiF_6$, to ω-hydrodicyclopentadienyl alkyl boranes or ω-hydrodicyclopentadienyl alkyl silanes, resp., or by reaction with $SnCl_4$ in presence of ether or NaCl to ω-hydrodicyclopentadienyl alkyl tin compounds, or by reaction with $SO_2$ or $SO_3$ and subsequent hydrolysis to the corresponding sulfinic or sulfonic acids, resp., etc., all of these further transformations being carried out according to known procedures of organoaluminum chemistry.

Specifically in the first mentioned case (displacement reaction with, e.g., ethylene), an additional advantage of the overall process according to the invention is the conversion of triisobutyl aluminum or diisobutyl aluminum hydride to, e.g., triethyl aluminum. This process is in commercial operation conducted directly, i.e. by displacement reaction of one of the two mentioned isobutyl aluminum compounds with ethylene, for the production of the very important polymerization cocatalyst intermediate triethyl aluminum.

Example

A 488 g. quantity of benzene solution containing 319 g. trihydrodicyclopentadienyl aluminum (about 75% purity) was charged to a 2-liter magnedrive autoclave.

| Reaction Variable | Suitable Range | Preferred Range |
|---|---|---|
| Mole ratio ethylene/organoaluminum compound | 1/1–1000/1 | 10/1–150/1 |
| Pressure, p.s.i.g. | 250–10,000 | 1,000–5,000 |
| Temperature, °C | 80–200 | 90–110 |
| Time, hours | 0.001–100 | 2–10 |

The reaction is preferably conducted in the presence of inert solvents such as listed hereinafter.

Because of the viscosity of the reactant and reaction product which increases considerably and progressively even at temperatures of approx. 100° C. as the reaction proceeds, it is moreover advisable to conduct the reaction in the presence of an inert solvent. Such a solvent is selected from the classes of solvents which are known to be indifferent towards organoaluminum compounds and which have a boiling point high enough to permit the conduct of the reaction at the abovementioned temperatures. Especially aliphatic, araliphatic, aromatic and certain halogenated aromatic hydrocarbons may be used. Examples for such solvents are cyclohexane, heptane, octane, isooctane, decane, decalin, tetralin, ethylbenzene, benzene, toluene, xylene, α-methylnaphthalene, chlorobenzene, and others.

It will be apparent to those skilled in the art that the final products of the growth reaction of tri-hydrodicyclopentadienyl aluminum compounds with ethylene may be promptly further converted, for instance by displacement reaction with ethylene or a higher 1-olefin to triethyl aluminum (or a higher tri-n-alkyl aluminum) and ω-hydrodicyclopentadienyl α-olefins according to

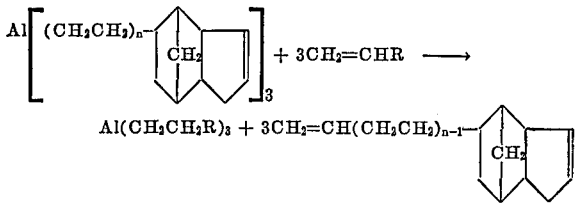

or by oxidation and subsequent hydrolysis of the re-

The solution was stirred at a rate of 1000 r.p.m., and the autoclave was further charged with ethylene up to a pressure of 725 p.s.i.g. at ambient temperature (19°), heated to 80° internal temperature and kept at this temperature for a period of 45 minutes. No decrease of the reactor pressure which had increased to 1030 p.s.i.g., was observed at this temperature.

The internal temperature was now increased from 80 to 90° (pressure increase from 1030 to 1050 p.s.i.g.), and the autoclave was kept at this temperature for a period of 1 hour during which the ethylene pressure decreased from 1050 to 1000 p.s.i.g.

Since this reaction rate was judged to be too slow additional ethylene was charged to the autoclave at this temperature by means of a compressor up to a pressure of 1500 p.s.i.g. The reaction was now allowed to proceed at these conditions (90° int. temp., 1000 r.p.m., 1500 p.s.i.g. initial ethylene pressure) for a period of 8¼ hours. Thereafter the pressure had dropped to 1125 p.s.i.g. The autoclave was cooled to room temperature, and all gas was vented slowly from the autoclave through a cold trap cooled with acetone/Dry Ice to −70°. 4 g. of solid condensate, identified as benzene, were obtained in the cold trap during this operation. The benzene solution of the reaction product which was now discharged from the autoclave into a 2-liter flask had a weight of 576.2 g.

An aliquot of the benzene solution of the reaction product (278.6 g., containing 201.6 g. organoaluminum reaction product) was hydrolyzed with the calculated amount of aqueous sulfuric acid. After the usual workup of the organic layer and after solvent distillation 185.8 g. of hydrolysis product proper were obtained. This material was shown to have the following composition as determined by a combination of several analytical procedures, i.e., fractional vacuum distillation, further separation of the cuts thus obtained by means of preparative VPC, and qualitative and quantitative determination of single components and/or fractions by VPC, MS, and NMR analyses:

| Component | Approx. Mole Percent [1] |
|---|---|
| $C_{10}H_{14}$  | 18.3 |
|  | 4.7 |
|  and | |
| $C_{12}H_{18}$, n=1 | 14.1 |
| $C_{14}H_{22}$, ditto, n=2 | 17.8 |
| $C_{16}H_{26}$, ditto, n=3 | 16.0 |
| $C_{18}H_{30}$, ditto, n=4 | 11.3 |
| $C_{20}H_{34}$, ditto, n=5 | 1.7 |
| $C_{22}H_{38}$, ditto, n=5 | 1.5 |
| $C_{24}H_{42}$, ditto, n=6 | 1.2 |
| $C_{26}H_{46}$, ditto, n=7 | 1.2 |
| Total | 87.8 |

Rest: Products of higher molecular weight.
[1] Calculated for a purity of the starting tri-hydrodicyclopentadienyl aluminum of 75%. No straight-chain paraffins were detected.

Although the present invention has been described with preferred embodiments, it is to be understood that modifications and variations may be resorted to, without departing from the spirit and scope of this invention, as those skilled in the art will readily understand.

What is claimed is:
1. A compound having the formula:

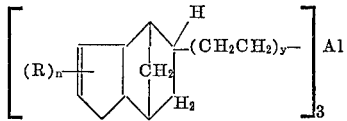

wherein R is selected from the group consisting of hydrogen, alkyl ($C_1$–$C_4$), aryl, alkoxy ($C_1$–$C_4$), aryloxy, and alkyl ($C_1$–$C_4$) mercapto, n is 1 to 2, and y is 1 to 10.

2. A compound defined in claim 1, wherein R is hydrogen and y is 1.
3. A compound defined in claim 2, wherein y is 2.
4. A compound defined in claim 2, wherein y is 3.
5. A compound defined in claim 2, where in y is 4.

References Cited

UNITED STATES PATENTS

| | | |
|---|---|---|
| 2,969,382 | 1/1961 | Mangham. |
| 2,987,531 | 6/1961 | Shapiro et al. |
| 2,987,534 | 6/1961 | Shapiro et al. |
| 3,356,704 | 12/1967 | Marcus. |
| 3,358,008 | 12/1967 | Marcus et al. |
| 3,356,705 | 12/1967 | Marcus et al. |
| 2,826,598 | 3/1958 | Ziegler et al. |

TOBIAS E. LEVOW, Primary Examiner

H. M. S. SNEED, Assistant Examiner

U.S. Cl. X.R.

260—429.7, 448.2, 503, 513.7, 606.5 617, 666